Patented Feb. 6, 1934

1,946,257

UNITED STATES PATENT OFFICE 1,946,257

PREPARATION OF ORGANIC ACIDS

Gilbert B. Carpenter, Wilmington, Del., assignor, by mesne assignments, to E. I. du Pont de Nemours & Company, Wilmington, Del., a corporation of Delaware No Drawing. Application February 28, 1931
Serial No. 519,237

13 Claims. (Cl. 260—116)

This invention relates to a process for the formation of organic compounds and particularly to the preparation of monocarboxylic acids by the interaction of aliphatic alcohols and carbon monoxide in the presence of a catalyst.

It is known that organic acids and esters can be prepared by the interaction, in the vapor or liquid phase, of organic compounds with the oxides of carbon. For example, it has been shown that by the condensation of methyl alcohol with carbon monoxide in the presence of a suitable catalyst, acetic acid, methyl acetate, and methyl formate may be prepared in proportions which are governed by the particular operating conditions. Acids have likewise been prepared from methane and carbon monoxide, from carbon monoxide and water vapor, and from ethers and carbon monoxide. Investigators have experienced considerable difficulty in their attempts to find, for these reactions, a catalyst which under given operating conditions would produce a good yield of the acid or other compound desired. Some of the catalysts which have been suggested include the hydrogenating and hydrating catalysts alone or in combination, metal acetate catalysts which split off acetic acid under 450° C., and acid catalysts, such as phosphoric acid and its acid salts.

There are numerous disadvantages in the employment of the before-mentioned catalysts, however. For instance, when the hydrogenating and hydrating catalysts are employed, particularly if acetic acid is the desired end product, but low yields of that acid result. With the metal acetate catalysts which decompose and split off acetic acid, frequent reactivation is required which renders their use uneconomical from the commercial standpoint. When the liquid acid catalysts are utilized, difficulties in supporting them and maintaining their initial activity are encountered.

An object of this invention is to provide a process for the preparation of higher molecular weight organic compounds thru the introduction of carbon monoxide into the lower molecular weight organic compounds. A further object of this invention is to provide a process for the preparation of monocarboxylic acids by the condensation of aliphatic alcohols with carbon oxides in the presence of a catlyst. Another object of this invention is to provide a process for the preparation of acids having the structural formulæ—$C_nH_{2n+1}COOH$—from alcohols having the structural formulæ—$C_nH_{2n+1}OH$—by subjecting the alcohols to the action of carbon monoxide in the presence of a halide and/or sulfate of manganese or a halide and/or sulfate of an element of group 2 of the periodic table.

Other objects will hereinafter appear.

I have found that organic acids can be prepared by the interaction of monohydroxy aliphatic alcohols in the presence of carbon monoxide by passing the vaporized alcohols together with carbon monoxide over a halide and/or sulfate of manganese or a halide and/or sulfate of the elements of group 2 of the periodic table. The catalysts included, which are particularly suitable, are the chlorides, bromides, iodides, and sulfates of zinc, calcium, magnesium, and manganese. They may be used either unsupported or supported upon charcoal, fuller's earth, kieselguhr, or similar materials which impart to the catalyst an extended surface area when presented to the gaseous reactants. The above catalysts may be employed alone or as mixtures or compounds thereof.

The alcohol-carbon monoxide reactions which can be accelerated by the above described catalysts may be expressed as follows:

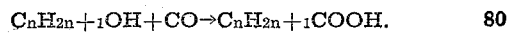
$$C_nH_{2n+1}OH + CO \rightarrow C_nH_{2n+1}COOH.$$

In accordance with the particular operating conditions, it will be found that, in some instances, the acid may not be formed directly in the free state, but may be produced as an ester by condensation of the acid formed with the particular alcohol used in the process, as indicated below:

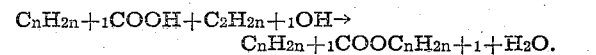
$$C_nH_{2n+1}COOH + C_2H_{2n+1}OH \rightarrow$$
$$C_nH_{2n+1}COOC_nH_{2n+1} + H_2O.$$

The alcohol used may be replaced, if desired, wholly or partly by the corresponding alkyl ethers of the alcohol, such as dimethyl ether, diethyl ether, or the mixed alkyl ethers, the alkyl esters, or other compounds containing one or more hydrolyzable alkoxy groups.

The synthesis can generally be efficiently carried out under the following operating conditions. The pressure may vary from approximately 25 atmospheres to 900 atmospheres or higher with the preferable operating range in the neighborhood of 350–700 atmospheres. The temperature within the reaction zone is quite critical as it determines to a large extent the product obtained. For example, when the methanol-carbon monoxide reaction is conducted at temperatures below 300° C. a low yield of methyl acetate will be obtained. While, on the other hand, at temperatures above 300° C. the yield of methyl acetate will increase with a corresponding decrease in the proportion of the parasitic products.

The carbon monoxide used may be obtained from various commercial sources, such, for example, as from water gas, producer gas, coke oven gas, and the like, but to obtain products of the highest degree of purity it is preferable to remove from such commercial gases the objectionable constituents such as sulfur compounds, metal carbonyls, etc.

The pressure of inert gases in the alcohol-carbon monoxide mixture is sometimes desirable. Nitrogen, for instance, has little deleterious effect on the reaction or yield and, in fact, may be advantageously used in order to aid in the temperature control and to prevent too great a conversion of the alcohol and carbon monoxide on one pass through the conversion apparatus. Other strictly inert gases will usually act similarly to nitrogen. It is, of course, understood that instead of introducing methanol itself into the reaction chamber substances or mixtures of substances which decompose to form alcohols or esters may be employed, but generally I prefer to introduce methanol directly into the gas stream leading to the converter.

My process can be conveniently carried out by passing purified carbon monoxide into methanol preferably containing water, maintained at such a temperature that the issuing gases will have the requisite proportion of methanol, carbon monoxide and water vapor. I have found that a gaseous composition, containing an excess of carbon monoxide over the methanol vapor, will give a good yield of acetic acid and ester on one pass through a converter containing one of my catalysts,—the temperature of the reaction chamber being maintained at approximately 300° C. and the pressure held in the neighborhood of 350 atmospheres.

Not only can methanol be catalyzed in the presence of carbon monoxide and my catalyst to acetic acid or the condensation product of the acetic acid with methanol, i. e. methyl acetate, but the higher alcohols, such as ethyl alcohol, propyl alcohol, butyl alcohol, and even the higher molecular weight alcohols, such for example as hexyl alcohol or octyl alcohol, may be similarly converted into an acid having correspondingly one more carbon atom than the alcohol treated. In fact, my process and catalyst may be employed with any of the monohydric alcohols, providing these alcohols volatilize without decomposition. When converting the higher aliphatic alcohols, some of which are not water soluble, and particularly if water is desired in the reaction, it is preferable to introduce the alcohol and water into the carbon monoxide as a vapor or spray. Any other suitable procedure may be employed, however, for intimately commingling the vapors of the alcohol and water with the oxide of carbon. When preparing products from the higher molecular weight compounds I may utilize in lieu of the alcohol the ether or ester thereof, the use of which will modify, to some extent, the type of product obtained.

I will now describe a specific embodiment of my process, but it will be understood that the details therein given and the compounds employed, either as reactants or catalysts, in no way restrict the scope of this invention, but merely illustrate one manner in which my process may be carried out.

*Example 1.*—A gaseous mixture, containing 90% carbon monoxide, 5% alcohol, 3% hydrogen, and 2% nitrogen, is passed over a zinc-iodide catalyst which is supported on activated charcoal. The pressure during the reaction is maintained at 700 atmospheres and the temperature at approximately 300° C. The catalyst is disposed in a suitable catalytic chamber for the carrying out of exothermic gaseous reactions. The condensate obtained upon the cooling of the converted gases contains approximately 16% acetic acid and 17% methyl acetate, together with some unconverted methanol. The acid may be separated from the mixture by simple distillation. The methyl acetate may be treated with sulfuric acid and distilled to obtain its acetic acid content.

*Example 2.*—Methanol and carbon monoxide can be converted into acetic acid in a manner similar to that described in Example 1 except that a cadmium-chloride catalyst supported on activated charcoal is employed. The condensate obtained after cooling the gases issuing from this catalyst will contain a good yield of the acid and its ester.

The apparatus, which may be employed for conducting these reactions, may be of any conventional type and preferably one in which the temperature of the exothermic reaction can be readily controlled at the optimum value. Owing to the corrosive action of acetic acid, the interior of the converter and apparatus leading therefrom should preferably be protected. This may be accomplished by using glass or glass-lined apparatus or by plating the inner surfaces thereof with chromium or silver or using for the construction of this equipment acid resisting high alloy steels containing, for example, high molybdenum, cobalt, tungsten, chromium, manganese, or nickel content.

From a consideration of the above specification it will be realized that any process in which a carbon oxide is combined with an organic compound giving a product containing a negative radical of an aliphatic acid, and particularly those in which monohydric alcohols are converted to mono-carboxylic acids, will come within the scope of this invention when such reactions are accelerated in the presence of a halide and/or sulfate of manganese or a halide and/or sulfate of an element of group 2 of the periodic table.

I claim:

1. A process for the preparation of aliphatic organic acids which comprises contacting a compound selected from the group consisting of monohydroxy aliphatic alcohols, the alkyl ethers and the alkyl esters, with a halide of an element selected from the elements of group 2 of the periodic table and manganese in the presence of carbon monoxide at reacting temperature.

2. A process for the preparation of aliphatic organic acids which comprises contacting an aliphatic alcohol which is not substantially decomposed when vaporized with a halide of an element selected from the elements of group 2 of the periodic table and manganese in the presence of carbon monoxide at reacting temperature.

3. A process for the preparation of aliphatic organic acids which comprises contacting a monohydroxy aliphatic alcohol which is not substantially decomposed when vaporized with a supported catalyst consisting of a halide of and element selected from the elements of group 2 of the periodic table and manganese in the presence of carbon monoxide at reacting temperature.

4. A process for the preparation of acetic acid which comprises contacting methanol with a halide of an element selected from the elements of group 2 of the periodic table and manganese in the presence of carbon monoxide at reacting temperature.

5. A process for the preparation of aliphatic organic acids which comprises passing carbon monoxide through an aqueous monohydroxy aliphatic alcohol solution and subsequently contacting the resultant vapor at an elevated temperature and pressure with a halide of an element selected from the elements of group 2 of the periodic table and manganese.

6. A process for the preparation of acetic acid which comprises passing methanol and carbon monoxide at an elevated temperature and pressure over a supported halide of an element selected from the elements of group 2 of the periodic table and manganese.

7. A process for the preparation of acetic acid which comprises passing methanol and carbon monoxide at an elevated temperature and pressure over a supported zinc iodide catalyst.

8. A process for the preparation of acetic acid which comprises passing methanol and carbon monoxide at an elevated temperature and pressure over a supported cadmium iodide catalyst.

9. A process for the preparation of acetic acid which comprises passing methanol and carbon monoxide at an elevated temperature and pressure over a supported zinc halide catalyst.

10. In a vapor phase process for the preparation of aliphatic organic acids from compounds containing at least one hydrolyzable alkoxy group and carbon monoxide, the step which comprises effecting the reaction in the presence of a halide of an element selected from the elements of group II of the periodic table and manganese as a catalyst therefor.

11. In a vapor phase process for the preparation of saturated aliphatic monocarboxylic acids from saturated monohydroxy aliphatic alcohols and carbon monoxide the step which comprises effecting the reaction in the presence of a catalyst consisting of a halide of an element selected from the elements of group II of the periodic table and manganese.

12. In a process for the preparation of acetic acid from methanol and carbon monoxide in the vapor phase, the step which comprises effecting the reaction in the presence of a catalyst consisting of a halide of an element selected from the elements of group II of the periodic table and manganese.

13. In a process for the preparation of acetic acid from ethanol and carbon monoxide the step which comprises effecting the reaction in the presence of a zinc halide catalyst.

GILBERT B. CARPENTER.